US012434800B2

(12) United States Patent
Anderson

(10) Patent No.: US 12,434,800 B2
(45) Date of Patent: Oct. 7, 2025

(54) WATER RESCUE DRONE

(71) Applicant: Stephen William Anderson, Rochelle, IL (US)

(72) Inventor: Stephen William Anderson, Rochelle, IL (US)

( * ) Notice: Subject to any disclaimer, the term of this patent is extended or adjusted under 35 U.S.C. 154(b) by 337 days.

(21) Appl. No.: 17/300,775

(22) Filed: Nov. 3, 2021

(65) Prior Publication Data

US 2023/0133018 A1    May 4, 2023

(51) Int. Cl.
| | |
|---|---|
| *B63C 9/02* | (2006.01) |
| *B63C 9/13* | (2006.01) |
| *B63C 9/20* | (2006.01) |
| *B63H 11/00* | (2006.01) |
| B63B 35/00 | (2020.01) |
| B63C 9/00 | (2006.01) |
| B63C 9/08 | (2006.01) |

(52) U.S. Cl.
CPC .......... *B63C 9/02* (2013.01); *B63C 9/13* (2013.01); *B63C 9/20* (2013.01); *B63H 11/00* (2013.01); *B63B 2035/008* (2013.01); *B63C 2009/0017* (2013.01); *B63C 2009/0094* (2013.01); *B63C 2009/084* (2013.01); *B63C 2009/085* (2013.01); *B63H 2011/006* (2013.01)

(58) Field of Classification Search
CPC .... B63C 9/02; B63C 9/13; B63C 9/20; B63C 2009/0017; B63C 2009/0094; B63C 2009/084; B63C 2009/085; B63C 9/32; B63H 11/00; B63H 2011/006; B63B 2035/008; B63G 2008/005
See application file for complete search history.

(56) References Cited

U.S. PATENT DOCUMENTS

| | | | | |
|---|---|---|---|---|
| 3,142,285 A | * | 7/1964 | Sorrentino | B63H 11/113 446/163 |
| 4,753,620 A | * | 6/1988 | Arney | B63C 9/02 441/83 |
| 5,879,214 A | * | 3/1999 | Bentley | B63H 11/00 280/22.1 |
| 6,604,480 B1 | * | 8/2003 | Sanchez | B63H 19/04 440/40 |
| 8,882,555 B2 | * | 11/2014 | Mulligan | B63C 9/00 441/80 |
| 2015/0307172 A1 | * | 10/2015 | Ng | B63C 9/0005 901/30 |

FOREIGN PATENT DOCUMENTS

| | | | | |
|---|---|---|---|---|
| CN | 107521635 A | * | 12/2017 | ............ B63B 35/00 |
| KR | 102178020 B1 | * | 11/2019 | |
| WO | WO-2022256868 A1 | * | 12/2022 | |

* cited by examiner

*Primary Examiner* — Andrew Polay

(57) ABSTRACT

The present invention relates to a rescue device capable of making multiple rescues in all weather and light conditions and rescuing conscious and unconscious persons, pets, and conveyances.

14 Claims, 3 Drawing Sheets

WATER RESCUE DRONE

FIELD OF THE INVENTION

The present invention relates to rescuing people, pets, and boats from dangerous water or ice situations.

BACKGROUND OF THE INVENTION

Water rescues have always posed a severe threat to rescuers. Rescuers are often killed in attempts to perform rescues. Rescues involve dangerous waters such as flooded rivers, backwashes, and whirlpools downstream from low head dams and the dams themselves.

Water is a very powerful force and unforgiving. There are no second chances, so when rescuers are called to rescue, they put their lives on the line, often using unsafe or makeshift means to reach those who need to be saved.

A similar problem exists with ice rescues. Thin ice and icy waters pose perilous situations to rescuers. It is often not simply falling through the ice and getting wet and cold, resulting in hypothermia. However, water currents under the ice can quickly push a person many feet from the air hole, causing drowning.

Each year in the United States alone, 3,960 people drown, an average of 11 per day! Drowning is the 3rd leading cause of unintentional injury death worldwide, accounting for 7% of all injury-related deaths. There are an estimated 236,000 annual drowning deaths worldwide, which is 246 deaths per day!

Water rescues require a rapid and effective method. They are often unsuccessful because of a lack of ability to deal with the situation. Water and ice rescues combine multiple hurdles to confound the problem for the rescuers. These include temperature, distance from shore, water speed, bad weather, improper equipment, lack of workforce, injuries, and training.

Solutions exist and have always existed; however, all existing solutions have their limitations. Simple solutions include throwing a life ring or rope. However, these are woefully inadequate because they limit the distance a rescue can be made from. In addition, they can miss the target as it is swept by leaving the struggling person without help.

Rescue boards have a rope attached to them and are equipped to carry a rescuer to the location required. These are often used on ice and work if the ice is strong enough to support the prone rescuer in reaching the victim. The rope is used to recover them.

Diving into the water and swimming to the person can sometimes work IF the rescuer is an experienced rescuer and understands how to rescue a drowning person and not let that person drown them simultaneously. This method is limited due to water temperature as well as distance and water speeds, and conditions. Swimming into a backflow below a dam to rescue another person would most likely result in the loss of two lives, yet it happens. People wish, and therefore try to do something!

Fire trucks have placed ladders over water and on ice to attempt rescues, which are sometimes successful. Often there is no access for a fire truck to get that close to the water, or the ladders are not nearly long enough to perform the job.

Helicopters have been called in and rescued many people and have also not saved many. A helicopter is limited to where it can go and what kind of weather it can operate in. An adequately equipped helicopter with an appropriately trained crew nearby must respond in moments to be effective. And of course, to station such teams and equipment strategically would be extremely expensive, making it cost-prohibitive.

More recently, an invention called a "WIRT" was developed using a quickly inflated fire hose with a steering device on the rescue end. This hose is inflated, making it rigid, then pushed across the ice to the person trapped. In a small ice hole or edge of ice situation, the hose can be steered by twisting it left or right, causing the fins to move the end. Once it must cross moving water, it becomes ineffective. The Wirt is an effective ice rescue device for many ice victim situations; it is very limited where it can be used. It is also limited by length.

Another modern invention is called a "waterwog." It is an inflatable boat designed to deal with rough waters. It serves many purposes in rescue but again is limited in its ability to reach many types of water and ice victims safely and requires two rescuers to endanger their lives to try and save another person's life.

More high-tech are several water rescue devices that are remotely controlled, battery-powered, and deployed quickly. These devices are moving in the right direction by removing the human risk element. But still, while the ones currently on the market do a "good job," they fall short of doing a "great job." They have a limited range of operations because they cannot "see" what is going on at the location. They are limited to rescuing one conscious person at a time. Experience has proven that even an unconscious person can be saved if retrieved in time.

It would be advantageous to provide a means to rescue unconscious persons.

It would also be advantageous to rescue boats from backwaters before the occupants are put in the water.

It would further be advantageous to provide a faster way to deploy and get to victims in all kinds of weather and light conditions.

SUMMARY OF THE INVENTION

In accordance with the present invention, a rescue device is provided capable of making multiple rescues in all weather and light conditions and rescuing both conscious and unconscious persons, pets, and conveyances.

BRIEF DESCRIPTION OF THE DRAWINGS

A complete understanding of the present invention may be obtained by reference to the accompanying drawings, when considered in conjunction with the subsequent, detailed description, in which.

Figure 1:
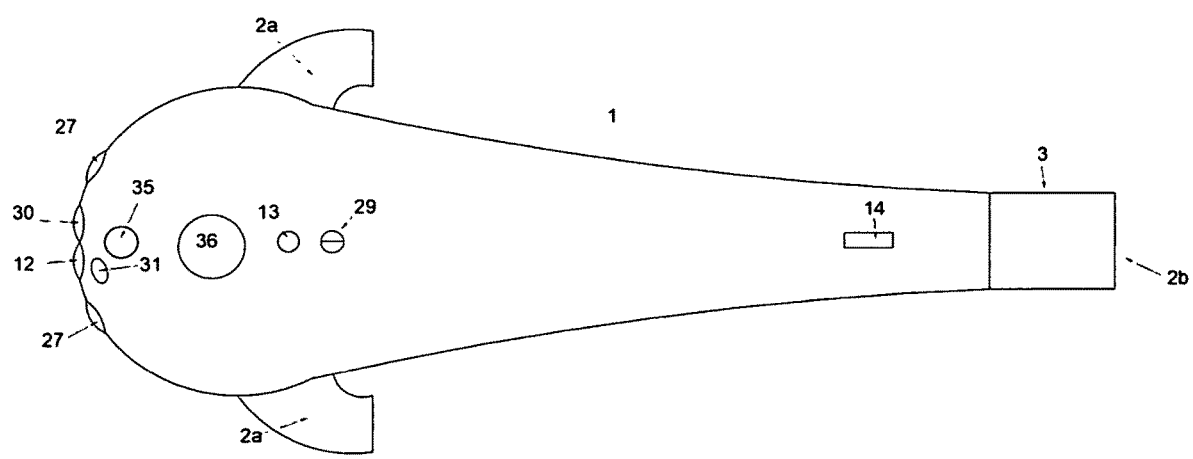
FIG. 1 is a top outside view.

Throughout this detailed description of the water rescue drone, we will refer to "rescue operator." The rescue operator refers to the person operating the controls of the water rescue drone.

The water rescue drone 1, is a remotely controlled craft capable of rescuing humans, animals, and watercraft. A remote-controlled device such as a Spektrum iX20 20-channel DSMX transmitter is used to control the craft from a safe location. It is also capable of recovery operations wherein people have drowned, are dead in the water from other causes, or retrieve sunken equipment such as snowmobiles, boats, cars, and aircraft. The invention is capable of multiple functions, including above surface, surface, and sub-surface travel. The Water Rescue Drone has search abilities using standard and thermal imaging cameras equipped with both white and infrared lighting to locate objects in the day or night on the surface or below the surface.

The water rescue drone 1, is capable of propulsion utilizing water jet power ejected through various moveable and controllable jets located around the device. This propulsion method enables the water rescue drone to enter highly turbulent areas such as below low-head-dams. The water below a low-head dam is so oxygenated that propeller and typical jet outboard drive boat motors cannot function. However, the water rescue drone supplied water from a low oxygen water supply. The water rescue drone is provided with such power that the expelled water stream is sufficient to lift it above the water when desired and have complete control over its speed and direction. The rescue operator remotely controls these jets through the activation of servo motors powered by a battery. The water jet power is supplied by a hose (not shown) connected to a water pump at the shore or in a rescue craft.

A global positioning device 36, strobe light 13, and navigation lights 29, permit the rescue operator to know where the unit is. The onboard cameras allow the operator to see what the water rescue drone 1, is near and doing.

Rescue is achieved through one of several means. For a person in the water, the water rescue drone 1, can speak to and hear the person through the onboard speaker and microphone 31.

This communication is vital in helping people to save themselves. The water rescue drone 1, is equipped with grab handles 9, (Shown in FIG. 3) to allow a person to latch on and be pulled to safety. The water rescue drone can carry multiple life preservers (not shown) attached to the grab handles 9, to supply numerous victims with floatation devices. The water rescue drone 1, is further equipped with oxygen 18 (shown in FIG. 3), so a person needing it can put a dive mask 17, over their face and get oxygen.

The water rescue drone 1, is also equipped with a grab hook 10, (shown in FIG. 3) or claw to latch on to unconscious, disabled or dead people to recover them. Often, drowning victims are rendered unconscious but still alive, and if retrieved in time, their lives can be saved. This grab hook 10, (shown in FIG. 3) or claw allows that to happen.

Water rescue is very hazardous to rescuers. The water rescue drone 1, removes the human portion of the rescue from danger and permits a much greater search and rescue area with a much greater ability to retrieve the victim or victims than other methods. The water rescue drone 1, can go into high turbulence and fast water areas and safely recover victims in the water or stranded boats in danger of sinking. In a preferred embodiment, the water rescue drone 1, is made from a lower-body 32, and upper body 33, removably connected using removable fasteners. A gasket (not shown) is placed between the molded body's lower and upper halves, making the unit water and airtight. The lower portion of the body contains the mounts for servo motors 19, battery 20, oxygen tanks, wire harnesses, and other components necessary for the functioning of the unit.

Referring now to FIG. 1, a top outside view, in a preferred embodiment of the present invention, the water rescue drone 1. In this view, we see the top outside portion of the invention showing the rear rotating propulsion jet outlet 2, and the rear directional jet 3. Both are used to propel the device forward and steer the device left, right, up, and down. The propulsion is provided by a high-pressure stream of water supplied by a remote high-pressure water pump that pumps the water to the device and then distributes it to the various onboard jets.

Jets 2A, are in rotatable fins used to lift and steer the water rescue drone 1, left, right, up, and down. Each jet consists of a directionally rotatable fin equipped with a high-pressure spray to control direction and velocity. The jet is controlled by a servo motor 19, (shown in FIG. 3) through a remote controller held by a rescue operator, an individual onshore or in a boat who has possession and control of the remote controller. The rescue operator can increase or decrease the flow rate and turn fins and jets to steer the device to where they want it to go.

For the rescue operator to know what is going on in front of the water rescue drone 1, the unit is equipped with two cameras removably mounted near the center front of the water rescue drone. The first camera is a Go Pro Camera 12, capable of seeing in any light conditions. The second seeing device is a thermal imaging camera 30, used in poor light conditions. To aid in the search and better see what is going on, at least one very bright light-emitting diode searchlight 27, is removably mounted on the front of the water rescue drone. In a preferred embodiment of the present invention, at least two light-emitting diodes are mounted to broaden the lighted area and redundancy should one fail. The location of the light-emitting diode 27, permits both surface and underwater use, whichever is required.

A speaker/microphone 31, is permanently mounted near the front of the water rescue drone 1, to communicate with victims. The rescue operator may communicate directly with the victim, providing them instructions or gaining valuable information about their condition or others with that victim. To aid the rescue operator in locating the device, a strobe light 13, is permanently affixed to the front top of the water rescue drone 1; knowing where the drone is, is vital to the rescue operation and the strobe light 13, is an aid in understanding this. A navigation light 29, consisting of the standard red and green water navigation light 29, is permanently mounted on the top of the water rescue drone 1, to the rear of the strobe light 13, to identify the direction of the water rescue drone 1, is traveling visually. The global positioning device 36 also provides direction and distance information to the rescue operator. Redundancy is done on purpose, so failing one portion of the system does not disable the entire unit.

To aid in the underwater operation, the water rescue drone 1, is equipped with air exhaust ports 31, 35, to cause a neutral bouncy. Air may be expelled to submerge, and air can be released from an internal oxygen tank to push water ballast out, refloating the water rescue drone 1, when desired. For example, the ballast control device may be a SAS Ballast System made SubDriver Technology and is remotely controlled by the rescue operator. In case of a signal control loss with the water rescue device 1, the ballast will act after several seconds of lost signal, exhausting the ballast and floating the water rescue device back to the surface for easy recovery.

The water rescue drone 1, is tethered by an aircraft cable (not shown) removably attached to the tether hook 14, If power is lost or drag is too much for the propulsion units, the water rescue drone 1, may be manually retrieved along with its cargo through the aircraft cable (not shown).

Figure 2:
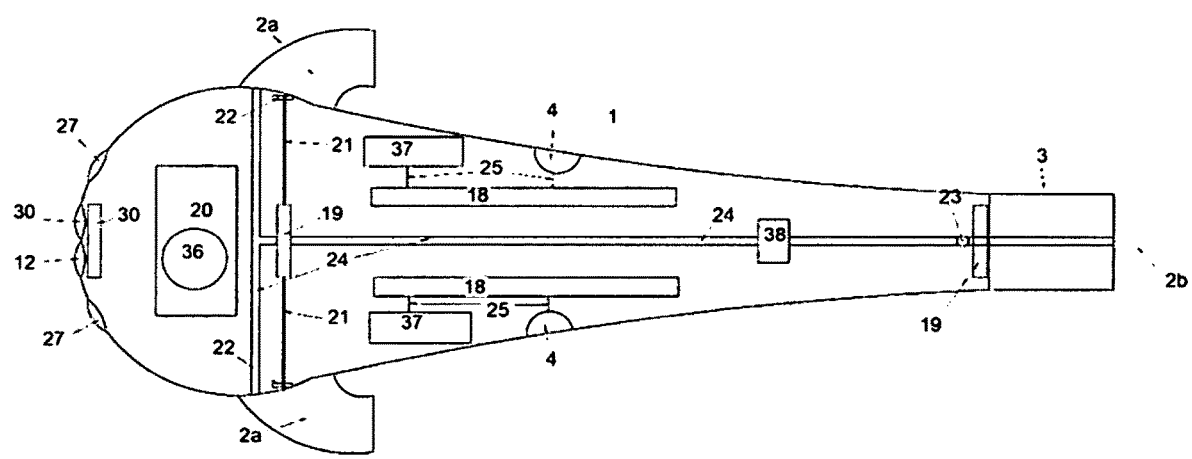
FIG. 2 is a Top Inside view.

Referring now to FIG. 2, a top view of the inside of the lower body 32. In the most preferred embodiment of the water rescue drone 1, a molded body is provided with two halves, an upper body 33, (not shown) and a lower body 32. The lower body 32, contains most of the unit's components, while the upper body 33 (not shown) includes a strobe light 13, navigation lights 29, a global positioning system, a tether attachment 14, and air vents 35.

The lower body 32, a battery 20, is mounted to provide electrical power to the onboard servo motors 19, light-emitting diodes 27, grab hook 10, propulsion jets 2a, 2b, the global positioning system 37. Power is also provided to the strobe light 13, and navigation light 29 in the upper body 33. 12-volt power is supplied through an onboard generator 38, to the battery 20, powered by the water used to control the water jets utilizing a turbine interrupting the high-pressure water flow. This function helps the battery to stay charged during extensive rescue operations.

Oxygen tanks 18, are fitted into the lower body 32, are used for supplying oxygen to the dive mask 4, or eject ballast water tanks 37, from the water rescue drone when the need to surface occurs. Air hoses 25, connect the oxygen tanks 18, to the diver's mask. Air hoses 25, join the oxygen tanks to the ballast tanks 37, servo valves (not shown), control where the oxygen is directed.

Servo motors 19, are permanently mounted in the lower body 32, and turn shafts 21, when prompted by the rescue operator, and are used to steer the water rescue drone 1, left, right, and up and down. Another servo motor 19, is used to control the direction of the rear jet housing 3, directing the water outflow 2. Since the water rescue drone is submersible and can travel underwater, the servo motors 19 and their attached shafts 21 are used to determine the direction of the water rescue drone. They may also be used to cause the water rescue drone 1, to maintain a stable position in moving water or wind so that a victim may get the help they need. The rear water jet 3, can be moved left-right, up, down, and in any combination to act as the primary steering mechanism for the water rescue drone 1. Two additional propulsion units are located on each side of the water rescue drone in the rotating jet arms 2a. The purpose of the rotating jet arms 2a, is to help lift, steer, propel, dive, and help surface the water rescue drone 1. They may also be used to reverse direction or to stabilize when hovering. They are each individually controlled for direction and power output.

To power the water rescue drone 1, high-pressure water is required. This water is supplied from a remote high-pressure water pump and travels by hose 6, to the water rescue drone 1, entering through the lower body 32, at hose opening 23. Hose opening 23, is a sealed hole for the supply hose 6, (shown in FIG. 3) to enter the water rescue drone. This opening must be sealed with a flexible seal to handle the twisting and tugging that can occur to the supply hose 6.

Figure 3:
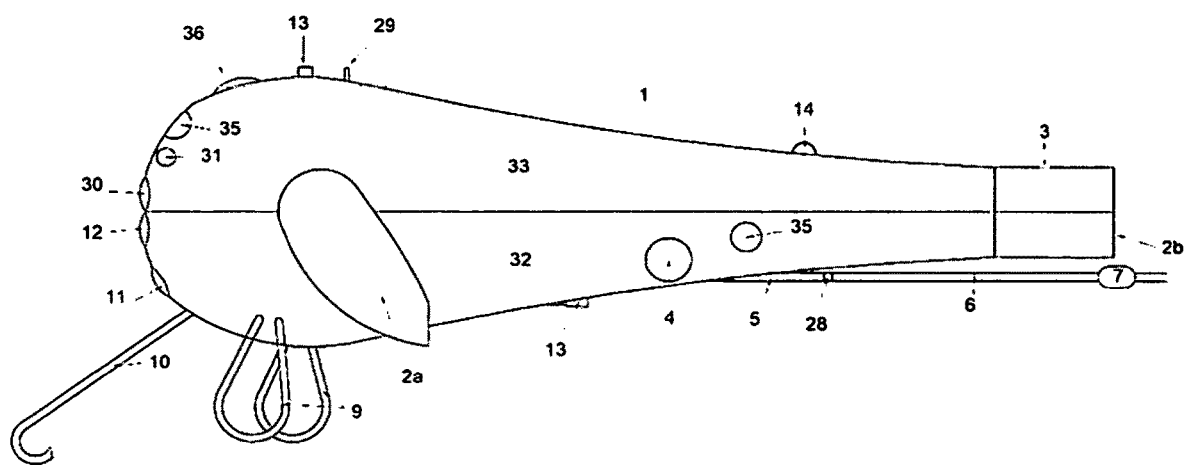
FIG. 3 is a side outside view.

Referring now to FIG. 3, a side view of the water rescue drone 1. There is provided a two-piece body to contain the components within. There is an upper body 33, and lower body 32, with a seal or gasket (not shown) that provides a waterproof seal between the upper body 33, and the lower body. There are also removable fasteners (not shown) to secure the upper body 33, to the lower body 32, in such a manner that the upper body 33, can be separated from the lower body 32, so that maintenance may be performed on the inside of the water rescue drone 1.

The water rescue drone 1, is powered by water jets. These water jets get their waterpower from a high-pressure water pump located remotely that uses a hose 6, that couples to an inlet pipe 5, utilizing a removable connector 28. The hose is equipped with floats 7, to reduce resistance created by a submerged hose. When so directed by the rotating jet arms 2a, and the rear rotating jet 2b, these water jets can lift the water rescue drone 1, above the water. When re-directed differently, they can propel the water rescue drone 1, across the surface of the water or ice. When again re-directed differently, they can cause the water rescue drone 1 to dive below the surface and travel submerged.

There are air exhaust ports 35, that permit the water rescue drone 1, to take on water for ballast to assist in diving and release that ballast when the water rescue drone 1, is to surface. The water is held in the ballast tanks 37, until not needed, and then is discharged through the air exhaust port 35, utilizing a ballast control such as a SAS Ballast System made SubDriver Technology using oxygen stored in the oxygen tanks 18.

Steering is accomplished by rotating the water jets 2a, and 2b, servo motors 19, are remotely controlled by the rescue operator causing the water jets 2a, and 2b, to rotate in the desired direction to accomplish the movement and actions wanted.

If all power and control are lost, or a heavy object is attached to the rescue drone 1, which is unable to retrieve the object under its own power, a cable or rope is attached to the rescue eyelet 14, so that the water rescue drone and its attached object can be manual pulled to safety.

Each side of the water rescue drone 1, is equipped with a removable diver's mask 4, attached to an oxygen tank 18, onboard the craft. This divers mask 4, allows a victim to get oxygen during the rescue.

A bottom-mounted strobe light 13, and top-mounted strobe light 13, allow the rescue operator and victims to see where the water rescue drone is at any time.

There is also a running light 29, permanently attached to the top of the upper body 33. This light consists of red and green lenses. Red indicates the port or left side, and green indicates the right or starboard side. The running light 29, aids the rescue operator visually in what direction the water rescue drone is traveling.

Grab handles 9, permit a victim to grab onto the water rescue drone 1, and be pulled to safety. The grab handles 9, may also be used to attach floatation devices (not shown). These devices can be removably acted to the grab handles 9, so that the person or persons can be pulled to safety. A tether attached to the floatation devices permits multiple victims to be rescued at the same time.

In cases where a victim is unconscious, a watercraft is being retried, or in recovery operations involving bodies or equipment, the grab hook 10, is used to attach the water rescue drone to the object then retrieve the water rescue drone 1, and the object, typically utilizing the cable (not shown) attached to the rescue cable eyelet 14.

The rescue operator needs to see what is going on. To aid the rescue operator in seeing, there are provided bright light-emitting diode lights 11, and two forms of cameras for visual contact. The first is a GoPro style camera 12, and a thermal imaging camera, 30, to aid in lowlight or dark conditions. The rescue operator always has a visual from both cameras on his monitor, such as a Spektrum iX20 20-channel DSMX transmitter.

While specific locations can be seen on the cameras, determining where the water rescue drone is located in the big picture can be more difficult. There fore a global positioning system 36, is on board to provide pinpoint location. The global positioning system provides a very accurate latitude, longitude position of the water rescue drone, which is displayed on the remote operator's monitor.

Victims are often bewildered and can be succumbing to hypothermia or exhaustion, or a combination of all three. In addition, they may be injured, such as a broken arm, having a heart attack or stroke, and having difficulty attaching themselves. A speaker microphone 31, is fitted to the front of the water rescue drone 1, to communicate with the victim.

Since other modifications and changes varied to fit particular operating requirements and environments will be apparent to those skilled in the art, the invention is not considered limited to the example chosen for disclosure purposes. Instead, it covers all changes and modifications that do not constitute departures from this invention's true spirit and scope.

Having thus described the invention, what is desired to be protected by Letters Patent is presented in the subsequently appended claims.

What is claimed is:

1. A water rescue drone system for rescuing people, (conscious or unconscious) pets, watercraft, and other objects comprising:
   A water rescue drone device comprising:
   Remote control for directing the water rescue drone to the object to be rescued;
   Rotating water jets for propelling the water rescue drone to the desired location on board camera for the rescue operation to visually locate the victim or object;
   visible white light to aid the operator n visual location;
   remote control for permitting the operator to remain safely away from the danger that has encapsulated the object being rescued;
   a hook or grab for causing the object to become attached to the water rescue drone;
   microphone and speaker for communicating with the victim;
   at least one oxygen tank and mask for supplying the victim oxygen;
   remote steering control for retrieving the object to a safe location; and
   a water rescue drone system comprising;
   a plurality of the aforementioned water rescue drone devices for providing rescue to more than one victim at a time.

2. The water rescue drone device in accordance with claim 1, wherein said means for propelling the water rescue drone device consists of at least one water jet for propulsion.

3. The water rescue drone device in accordance with claim 1, contains at least one camera to provide a visual representation to the rescue operator.

4. The water rescue drone device in accordance with claim 1, contains at least one navigation light for locating the device.

5. The water rescue drone device in accordance with claim 1, is equipped with at least one microphone speaker.

6. The water rescue drone device in accordance with claim 1, is equipped with at least one water supply hose to provide the device with a water source for its water jet(s).

7. The water rescue drone device in accordance with claim 1, is equipped with at least one tether so that if the device power fails the operator may retrieve it along with anyone rescued.

8. The water rescue drone device in accordance with claim 1, is equipped with at least one onboard direct current generator to power the drone's electrical needs.

9. The water rescue drone device in accordance with claim 1, is equipped with at least one global positioning system connected to the operator for GPS position purposes.

10. The water rescue drone device in accordance with claim 1, is equipped with at least one direct current storage battery.

11. The water rescue drone device, in accordance with claim 1, is equipped with at least one grab hook.

12. The water rescue drone device, in accordance with claim 1, is equipped with at least one light emitting diode to light up the search area.

13. A water rescue drone device for rescuing people (conscious or unconscious) trapped
   in the water from such occurrences as a boat sinking or falling off a bridge, pets, watercraft, and other objects comprising:
   Remote controlled steering for directing the water rescue drone to the object, (human or pet) to be rescued underwater;
   At least one rotating water jet for propelling the water rescue drone to the desired location;
   a ballast control system for controlling ballast by increasing or decreasing to meet the current needs;
   light emitting diode for the rescue operation to locate the victim or object;
   lighted camera for seeing underwater and in the dark;
   remote control and monitoring permitting the operator to remain safely away from the danger that has encapsulated the object being rescued; grab hook for causing the object to become attached to the water rescue drone; microphone and speaker for communicating with the victim; at least one oxygen tank and mask for supplying the victim oxygen;
   remote control steering for retrieving the object to a save location.

14. A water rescue drone device for rescuing people (conscious or unconscious), pets,
   watercraft, and other objects comprising:
   remote steering for directing the water rescue drone to the object to be rescued;
   at least one hose supplying high-pressure water to a water jet:
   at least rotatable one water jet for propelling the water rescue drone to the desired location;
   at least one Light Emitting Diode for the rescue operation to visibly locate the victim or object;
   remote control and monitoring for permitting the operator to remain safely away from the danger that has encapsulated the object being rescued;
   at least one grab hook for causing the object to become attached to the water rescue drone;
   a microphone and speaker for communicating with the victim;
   at least one oxygen tank and mask for supplying the victim oxygen;
   remote control for retrieving the object to a safe location.

* * * * *